Jan. 11, 1955 F. R. HICKERSON 2,698,996
FOOD OR MEDICINE ADMINISTERING SPOON
Filed July 30, 1951
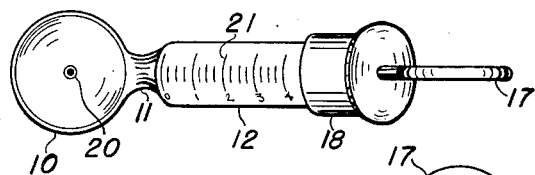
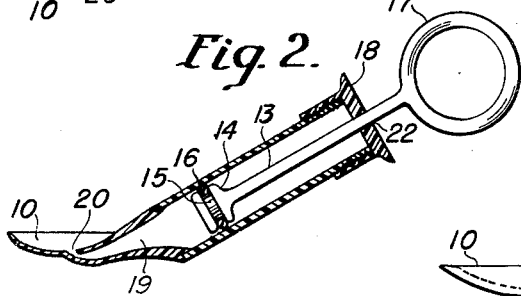
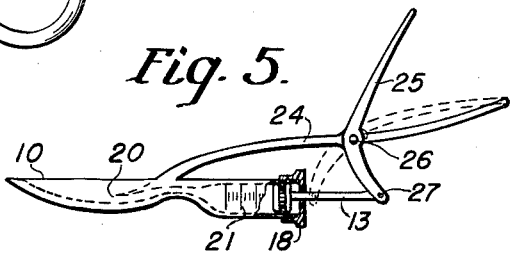
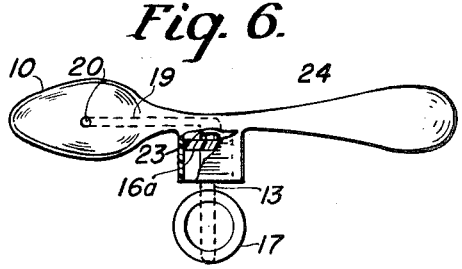
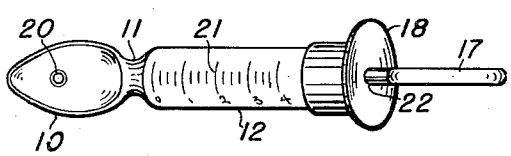
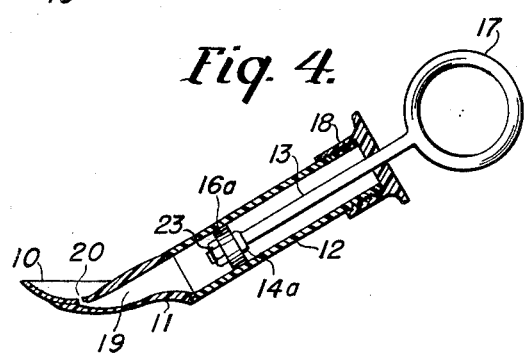
INVENTOR
FREDERICK R. HICKERSON
BY William R. Wright, Jr.
AGENT

United States Patent Office 2,698,996
Patented Jan. 11, 1955

2,698,996

FOOD OR MEDICINE ADMINISTERING SPOON

Frederick R. Hickerson, Rockaway, N. J.

Application July 30, 1951, Serial No. 239,280

3 Claims. (Cl. 30—123)

The present invention relates to feeding devices for infants, invalids or enfeebled older persons who have difficulty in taking food in the usual quantities or who must receive their food or medicines gradually or in measured amounts. The present invention is also useful for administering food or medicines to animals in gradual or measured amounts.

In feeding young children, an ordinary spoon is not a satisfactory implement in that the spoon often contains either too much or too little food or medicine for the child to accept at one swallow with the result that the spoon must either be refilled from a dish or that spillage may take place. The same factors are also present in the administering of food or medicines, particularly where the quantity must be exactly measured, to ill or enfeebled persons as well as to animals or other pets.

It is an object of the present invention to provide a spoon-like utensil which makes it possible to continuously or discontinuously and completely or partially fill its spoon bowl with food or medicine from a reservoir which forms a part of the implement.

It is also an object of the present invention to provide a spoon-like utensil which makes it possible to continuously or discontinuously and completely or partially fill its spoon bowl with a fluid food or medicine in measured quantity from a reservoir which is translucent and graduated and is a part of the implement.

It is also an object of the present invention to provide a spoon of this type which will retain its contents without attention from the operator, thus leaving both of his hands free if the feeding or administering is interrupted for any reason.

It is also an object of the present invention to provide a feeding or medicine administering spoon which is completely sanitary in operation since the operator of the spoon in no way touches the food or medicine.

Other objects and advantages of the present invention will be apparent from the detailed description of the device and its operation which follows.

In the drawings:

Figure 1 is a plane, external view of the entire spoon.

Figure 2 is a cross sectional view of the spoon.

Figure 3 is a plan view of the spoon showing an alternate shape for the spoon bowl.

Figure 4 is a cross sectional view of the spoon shown in Figure 3 showing an alternate plunger and seal arrangement.

Figure 5 is an external view of the spoon showing an alternate type of plunger operating arrangement.

Figure 6 is a cutaway plan view of the spoon showing the plunger and plunger cylinder located on the side of the spoon.

In previous feeding spoons it has been difficult to control the exact amount of food or medicine in the concavity of the spoon bowl at a specific time without the use of two handles and without the need for at least one hand at all times. With the present invention, a plunger is provided which may be adjusted to the desired position and the spoon laid down at any time without spoiling this adjustment or causing leakage of the fluids, either liquid or soft solid, contained within it. This is particularly advantageous when the quantity to be administered must be exact and for some reason the feeding process must be temporarily interrupted, such as would be the case if the patient, be he human or other animal, should prove uncooperative and turn aside his head.

An important feature of the present invention lies in the graduated scale applied to its reservoir to enable the user to fill the reservoir with the exact amount of food or medicine desired without any necessity for separate measuring devices, funnels and other cumbersome equipment. This spoon, or feeder, as it might be termed, can be filled with one hand by placing the bowl in the fluid sufficiently to cover the orifice with the plunger all the way in, and then slowly moving the plunger outward i. e. away from the bowl until the fluid reaches the desired level as shown on the graduated scale. The reservoir is made of a translucent material so that the fluid level is readily visible. It is to be understood that the term translucent is intended to include all materials which transmit light.

In Figures 1 and 2 is shown the overall configuration of an arrangement of the present invention comprising principally a spool bowl 10 having a concavity in its upper surface, an opening 20 in this upper surface, a neck 11 attaching bowl 10 with a reservoir or hollow handle 12, an enclosed passage 19 through neck 11 to afford communication between opening 20 and the interior of reservoir 12, and a manual plunger 13 having a piston 14 attached to it slidable within reservoir 12 in sealing relationship to its walls by virtue of resilient sealing ring 16 set in groove 15. Reservoir 12 is preferably cylindrical in shape to allow plunger 13 to rotate on its longitudinal axis, and to facilitate manufacture. However, this cylindrical shape, while desirable, is not absolutely essential to its operation. A cap 18 is provided at the outer end of reservoir 12 to close the reservoir and to serve as a guide for plunger 13 as it moves in and out through hole 22. Cap 18 is threaded in place as shown in order that it may be easily removed for disassembly of the device for cleaning purposes. At the outer end of plunger 13 is a loop 17 of sufficient diameter to allow a finger of the operator to be inserted.

The entire device as shown in Figures 1 and 2, with the exception of the resilient sealing ring 16, is intended to be made of one of the translucent "plastic" materials such as polyethylene or a similar material. Other materials such as glass or metal or combinations of these can be used but the "plastic" material is advantageous in that it is practically unbreakable, causes no objectionable taste in the food or medicine, and lends itself readily to production in large quantities.

In Figures 3 and 4 is shown a spoon having bowl 10 which is here ovate in shape in plan form instead of the round form shown in Figures 1 and 2. This spoon also has a different sealing arrangement which comprises a resilient disk 16a having a hole in its center sufficient to allow it to pass over the end of plunger 13 and to rest against shoulder 14a. A nut 23 is threaded to the end of plunger 13 to hold the disk or seal in place. This arrangement would be advantageous in the event that it is desirable as a matter of preference to construct plunger 13 of a metal such as stainless steel.

An arrangement is shown in Figure 5 whereby the reservoir is separate from the handle and extends straight outward from bowl 10 in the manner shown rather than in the upward swept manner of the arrangement shown in Figures 2 and 4. Instead of the reservoir being located in the handle of the spoon, it is located below a separate handle 24. A pin 26 is located approximately in the position shown on handle 24 and serves as a pivot for arm or lever 25 which has an upwardly extending portion above handle 24 and a downwardly extended portion below handle 24. At the lower end of arm 25 is a pin 27 which acts as a pivot for the outer end of plunger 13 in the manner shown. With this arrangement, a squeezing action applied to handle 24 and arm 25 brings them toward one another, thus causing plunger 13 to move inward through the reservoir to force the fluid contained within it to pass through hole 20 into the concavity of the bowl 10.

In all of the figures, the friction of the resilient seal against the wall of the cylinder is sufficient to hold it and plunger 13 in any position along graduated scale 21 so that the ejection of fluid from orifice 20 can be stopped at any time and the remainder of the fluid will stay in place in the reservoir until the plunger is again moved.

All of the various arrangements shown are operated in substantially the same manner. The handle of the spoon is grasped in the usual manner and one or more of the fingers is used to operate the plunger to expel the fluid contents of the reservoir. In the arrangement shown in Figure 4, wherein the reservoir extends from the side at right angles to the handle, it is most convenient to use the thumb to operate the plunger. It is important to note that the hand or the fingers of the operator do not come in contact with the contents of the reservoir or spoon bowl at any time, even during filling as described earlier in this specification.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only by the scope of the following claims.

What is claimed is:

1. A device for administering food or medicinal materials comprising a tubular handle open at one end and tapering abruptly toward and opening into a conventional spoon at its other end, a piston slidably mounted within said handle and having a sealing fit with the interior surface thereof, a centrally apertured cap mounted on and closing said one end of said handle, and a plunger slidably guided in said aperture and connected to said piston and operative to force materials from said handle to or from said spoon.

2. A device as recited in claim 1 wherein said piston comprises a resilient disc.

3. A device as recited in claim 1 wherein said piston includes a peripheral groove and a resilient seal therein.

References Cited in the file of this patent

UNITED STATES PATENTS

| Number | Name | Date |
|---|---|---|
| 1,921,535 | McLean et al. | Aug. 8, 1933 |
| 1,946,867 | Mathieu et al. | Feb. 13, 1934 |
| 2,252,119 | Edmonds | Aug. 12, 1941 |
| 2,309,861 | Mureau | Feb. 2, 1943 |
| 2,435,805 | Tanner | Feb. 10, 1948 |
| 2,453,525 | McNeil | Nov. 9, 1948 |
| 2,496,707 | Frye | Feb. 7, 1950 |
| 2,550,210 | Vance | Apr. 24, 1951 |